(No Model.)

F. A CARNES.
CARRIAGE AXLE BOX.

No. 252,733. Patented Jan. 24, 1882.

WITNESSES:

INVENTOR:
F. A. Carnes
BY Munn & Co.
ATTORNEYS.

UNITED STATES PATENT OFFICE.

FRANK A. CARNES, OF BROOKLINE, MASSACHUSETTS.

CARRIAGE-AXLE BOX.

SPECIFICATION forming part of Letters Patent No. 252,733, dated January 24, 1882

Application filed December 8, 1881. (No model.)

*To all whom it may concern:*

Be it known that I, FRANK A. CARNES, of Brookline, in the county of Norfolk and State of Massachusetts, have invented a new and useful Improvement in Carriage Axles and Hubs, of which the following is a full, clear, and exact description.

Reference is to be had to the accompanying drawings, forming a part of this specification, in which similar letters of reference indicate corresponding parts in all the figures.

Figure 1:
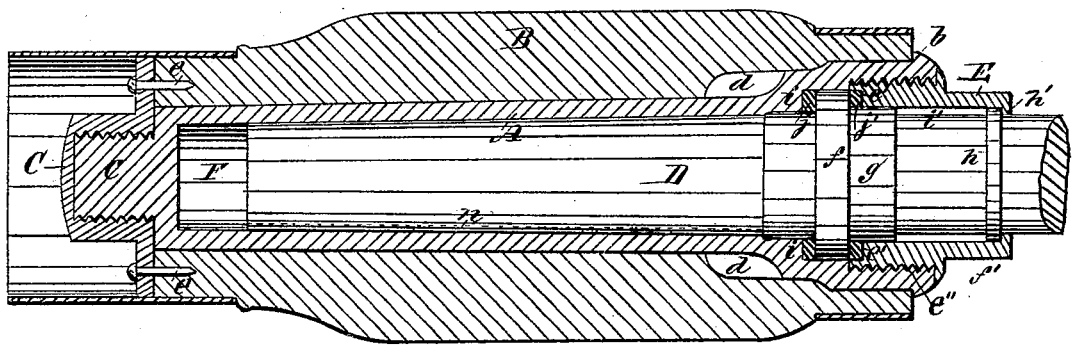
Figure 2:
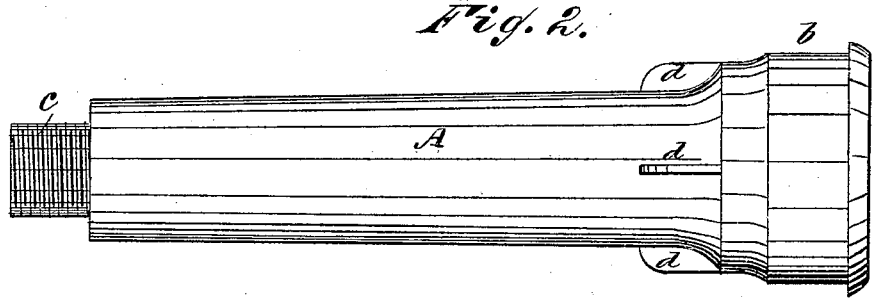
Figure 3:
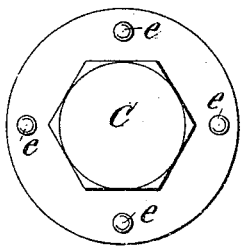
Figure 4:
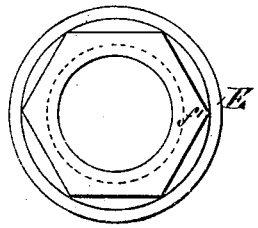
Figure 5:
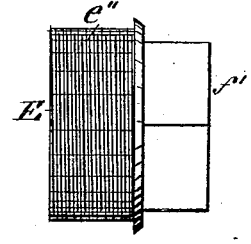

Figure 1 is a sectional elevation of my improved axle and hub. Fig. 2 is a side elevation of the axle-box. Fig. 3 is a front elevation of the screw-cap for the outer end of the axle-box. Fig. 4 is a front elevation, and Fig. 5 is a side elevation, of the sleeve or nut for securing the hub upon the axle.

The axle-box A is formed with the enlargement $b$ at its inner end, which is internally screw-threaded, and with the reduced portion $c$ at its outer end, which is externally screw-threaded, and with the fins $d$, which tend to prevent the wooden hub B from turning upon the axle-box. The screw-cap C is placed upon the reduced portion $c$ of the axle-box, and is secured to the hub by the nails, screws, or bolts $e\ e$, which pass through the flange of the screw-cap, as shown in Fig. 1.

The axle D is formed or provided with the collars or rings $f$, $g$, and $h$. The collars or rings $g$ and $h$ project an equal distance from the main part of the axle and form the bearings for the sleeve or nut E, while the collar or ring $f$ is of larger diameter or projects a greater distance from the main part of the axle, and is surrounded by the enlarged portion of the axle-box when the wheel is placed upon the axle, and forms a stop or abutment for the edge of the sleeve or nut E.

Between the shoulder $i$ of the axle-box and the collar or ring $f$ is placed the washer $j$, and between the opposite side of the said ring or collar and the forward edge of the sleeve or nut E is placed the washer $j'$, which fits in the recess $e'$ formed in the end of the nut or sleeve.

The sleeve or nut E is formed with the external screw-thread, $e''$, and the square or many-sided portion $f'$, and is hollowed out upon the inside, as shown at $i'$, so as to form the flange $h'$, which fits against the collar or ring $h$, as shown in Fig. 1, thereby preventing the entrance of sand or dirt to the axle and limiting the forward or outward movement of the sleeve or nut upon the axle. Along the under side of the axle is formed the groove $n$, which serves to conduct the oil from the oil-chamber F, formed by making the axle-box of greater length than the axle, to the whole bearing-surface of the axle.

To remove the wheel from and replace it upon the axle it is only necessary to place a wrench upon the square or many-sided portion $f'$ of the nut or sleeve E and turn the wheel upon the axle one way or the other, as the case may be, thus obviating the necessity of handling the nut with the hands and of detaching or displacing any of the parts from the axle.

It will be seen that by means of the collars or rings $g$ and $h$ and the hollowing out of the nut or sleeve E the bearing-surface of the sleeve upon the axle is greatly reduced, thus reducing the friction to the minimum; and it will be seen that a hub of this construction can be made small and compact, and that it is simple and cheap of construction.

Having thus described my invention, I claim as new and desire to secure by Letters Patent—

The axle-box A, formed with the reduced externally-threaded portion $c$, the enlarged internally-threaded portion $b$, and the oil-groove $n$, in combination with the screw-cap C, secured to the hub B, and the nut or sleeve E, formed with the flange $h'$, the axle being provided with the collars or rings $f$, $g$, and $h$ and made shorter than the axle-box, substantially as described.

FRANK ARTHUR CARNES.

Witnesses:
HERBERT W. CARNES,
GEO. W. CARNES.